United States Patent [19]

Garton et al.

[11] Patent Number: 4,851,484

[45] Date of Patent: Jul. 25, 1989

[54] ANHYDRIDE-BASED FORTIFIERS FOR ANHYDRIDE-CURED EPOXY RESINS

[75] Inventors: Andrew Garton, Storrs, Conn.; Paul D. McLean, Nepean, Canada

[73] Assignee: Canadian Patents & Development Ltd., Ottawa, Canada

[21] Appl. No.: 163,807

[22] Filed: Mar. 3, 1988

[30] Foreign Application Priority Data

Mar. 12, 1987 [CA] Canada ................... 531931

[51] Int. Cl.[4] ............................................. C08G 59/48
[52] U.S. Cl. ............................... 525/504; 525/423; 528/113; 528/341; 528/363
[58] Field of Search ............... 528/113, 341, 363; 525/423, 504; 252/182.28

[56] References Cited

U.S. PATENT DOCUMENTS

| | | | |
|---|---|---|---|
| 2,955,101 | 10/1960 | Bruin et al. | 528/113 X |
| 2,970,972 | 2/1961 | Wear et al. | 528/113 X |
| 3,639,657 | 2/1972 | Moran et al. | 528/113 X |
| 4,212,959 | 7/1980 | Fukami et al. | 528/113 X |
| 4,668,757 | 5/1987 | Nichols | 528/113 X |
| 4,673,723 | 6/1987 | Cuzin | 528/113 |

*Primary Examiner*—Earl Nielsen
*Attorney, Agent, or Firm*—Alan A. Thomson

[57] ABSTRACT

An anhydride-cured epoxy resin (epoxy resin + anhydride curing agent + catalyst) may be fortified (i.e. increased in strength and modulus without being made brittle) by the addition of a carboxylic acid and the reaction product of a carboxylic acid anhydride and a substituted aromatic amine. Strengths as high as 125 MPa and moduli as high as 3500 MPa have been attained, as well as elongations up to 6% and an increase in the ability of the plastic to yield before fracture (ductility), compared to 80 MPa strength, 3000 MPa modulus and 2.4% elongation for the unfortified system (strengths and moduli are tensile).

16 Claims, 1 Drawing Sheet

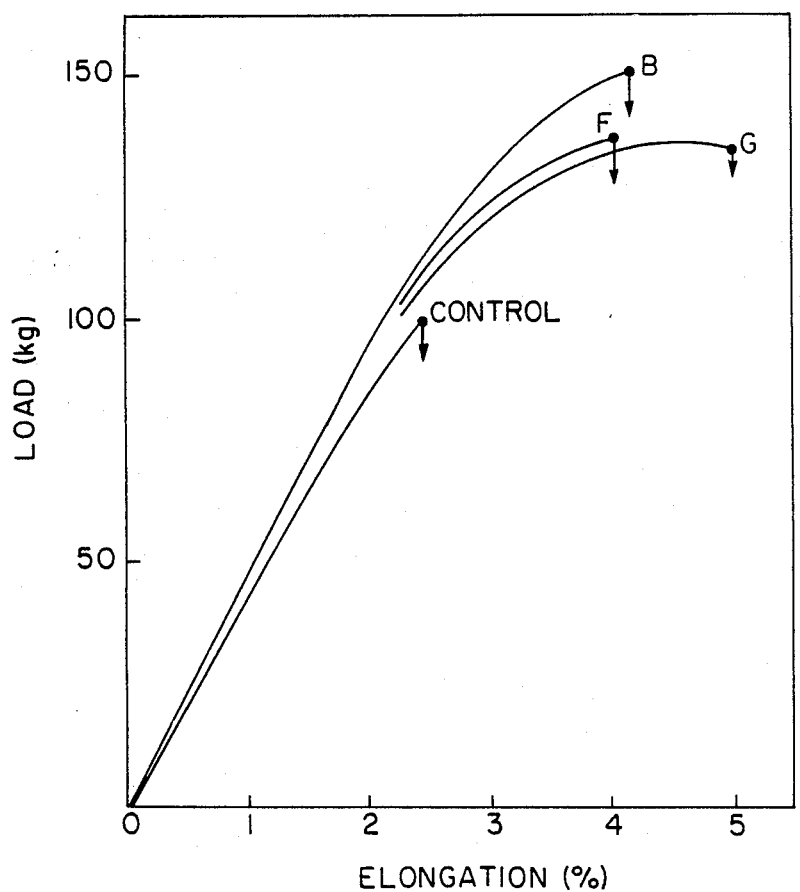
FIGURE: LOAD-ELONGATION CURVES FOR VARIOUS FORTIFIERS IN AN ANHYDRIDE-CURED EPOXY RESIN.

ANHYDRIDE-BASED FORTIFIERS FOR ANHYDRIDE-CURED EPOXY RESINS

BACKGROUND AND PRIOR ART

Anhydride-cured epoxy resins are made up of an epoxy resin component [e.g. a diglycidyl ether of bisphenol A (DGEBA)], an anhydride cross-linking agent [e.g. phthalic anhydride (PA)], and a catalyst (e.g. benzyldimethylamine (BDMA)]. Diluents or fillers are also often added for economic or processing reasons. The resin, curing agent and catalyst are mixed and "cured" usually at elevated temperatures. Such a plastic typically has a tensile strength of about 70 MPa, a tensile modulus of about 2800 MPa, an elongation-to-break of 1-6%, and a glass transition temperature ($T_g$) of about 140° C. All these values will vary somewhat with the stoichiometry of the mixture and the curing conditions (see for example, H. Lee and K. Neville, "Handbook of Epoxy Resins", McGraw-Hill, New York, 1967). Anhydride-cured epoxy resins have excellent electrical properties, good thermal stability and good chemical resistance, but are generally regarded as being brittle, which limits their use in structural applications where high modulus and strength as well as good impact resistance are required. Considerable effort has been expended to improve on these properties, but no completely satisfactory solution currently exists because improvement in one property has been gained only at the expense of others (e.g. solvent resistance, $T_g$, ductility, modulus, processability, cost).

Many anhydride curing agents or hardeners have been used in epoxy resin systems, in particular multi-ring alicyclic anhydrides such as methyl-bicyclohept-5-ene-2,3-dicarboxylic acid anhydride, also known by the trademark Nadic methyl anhydride (NMA) or aromatic anhydrides such as phthalic anhydride (PA). In some cases, organic acids are used in conjunction with anhydrides to reduce cure times and improve impact properties. In U.S. Pat. No. 2,890,210, Phillips et al, 1959, the use of a carboxyl terminated polyester is described as a co-curing agent with an anhydride for epoxy resins. May (SPE Transactions 3, 251-9, 1963) describes the replacement of some of the PA curing agent for DGEBA resin with phthalic acid, and its effect on the mechanical properties and heat deflection temperature of the plastic.

Antiplasticisation in cross-linked epoxy resin systems has been described in the literature. For instance, N. Hata et al (J. Appl. Polym. Sci. 17, 2173-81, 1973) describe pentachlorobiphenyl as an effective anti-plasticiser, with dibutylphthalate and 2,2 bis[4-(2-hydroxy-3-phenoxyl-propoxy)phenyl]propane as less effective antiplasticisers. There evidently has been little recent interest in this, possibly because materials such as pentachlorobiphenyl are environmentally objectionable.

We have found an alternative method of improving the mechanical properties of anhydride-cured epoxy resins by adding reaction products which act as fortifiers to conventional epoxy resin+anhydride curing agent formulations.

SUMMARY OF THE INVENTION

Our invention includes a fortifier for strengthening anhydride-cured epoxy resins comprising:
(i) a carboxylic acid;
and (ii) the reaction product of a carboxylic acid anhydride and an aromatic amine;
the molar proportions of (i) to (ii) being selected to give a final free anhydride-to-acid mole ratio within the range of about 0.051 up to about 10/1, the free anhydride being that remaining after reaction in (ii).

The invention also is directed to a curable epoxy resin composition comprising:
(a) a resin-forming polyepoxide; optionally (b) an anhydride curing agent and cross-linking catalyst for (a); and
(c) a fortifier for (a)+(b) comprising:
(i) a carboxylic acid,
and (ii) the reaction product of a carboxylic acid anhydride and an aromatic amine (having the amine group attached to an aromatic ring).

In most cases, the mole ratio of carboxylic acid to fortifier reaction product will be within the range 0.1/1-1.5/1.

If desired, the anhydride content of fortifier (c) may be adjusted so that no additional anhydride curing agent in (b) is necessary. This invention also includes this composition cured to a strong, high modulus, relatively ductile solid form.

The invention further includes a process of fortifying an epoxy resin comprising:
(a) pre-reacting a carboxylic acid anhydride with an aromatic amine to form a fortifier reaction product;
(b) mixing said reaction product with a resin-forming polyepoxide to form a mixture;
(c) providing for the presence in said mixture of sufficient anhydride groups to cure said resin composition by one of (i) ensuring that said reaction product contains excess unreacted anhydride groups, and (ii) including in the mixture an anhydride curing agent;
(d) providing that said mixture contains an unreacted carboxylic acid; and
(e) incorporating a cross-linking catalyst to form said curable composition.

One preferred procedure involves:
(a) reacting a carboxylic acid anhydride with an aromatic amine (having the amine group attached to an aromatic ring);
(b) mixing product (a) with a carboxylic acid (preferably aliphatic);
(c) mixing the above fortifier (a)+(b) with an anhydride curing agent, a resin-forming polyepoxide and a crosslinking catalyst (in that order); and
(d) heat curing the composition to form a strong high modulus, relatively ductile solid.

Preferably in step (a) about 1 mole of carboxylic acid anhydride is reacted with about 0.1 to 0.9 moles of amine by heating to about 120°-170° C. for about 1-2 hours.

DESCRIPTION OF THE DRAWING

The Figure is a graph showing load vs extension (strain or elongation in %) for various fortifiers in an anhydride-cured epoxy resin. The components of the fortifiers are described in the Examples below.

DETAILED DESCRIPTION AND PREFERRED EMBODIMENTS

The resin-forming polyepoxide to be fortified can be any known to form epoxy resin matrices and will have a plurality of reactive 1,2-epoxy groups. These resin-forming polyepoxides should be curable by anhydride curing agents.

These polyepoxide materials can be monomeric or polymeric, saturated or unsaturated, aliphatic, cycloaliphatic, aromatic or heterocyclic, and may be substituted, if desired, with other substituents besides the epoxy groups, e.g. hydroxyl groups, ether radicals, aromatic halogen atoms and the like.

A widely used class of polyepoxides which can be fortified according to the practice of the present invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol; 2,4'-dihydroxydiphenylethylmethane; 3,3'-dihydroxydiphenyldiethylmethane; 3,4'-dihydroxydiphenylmethylpropylmethane; 2,3'-dihydroxydiphenylethylphenylmethane; 4,4'-dihydroxydiphenylpropylphenylmethane; 4,4'-dihydroxydiphenylbutylphenylmethane; 2,2'-dihydroxydiphenylditolylmethane; 4,4'-dihydroxydiphenyltolyl-methyl methane and the like. Other polyhydric phenols which may also be co-reacted with an epihalohydrin to provide these epoxy polyethers are such compounds as resorcinol, hydroquinone, substituted hydroquinones, e.g. p-tert-butylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g. polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as α-monothioglycerol, α,α'-dithio-glycerol, and the like, polyhydric alcohol partial esters, such as monostearin, pentaaerythriotol monoacetate, and the like, and halogenated polyhydric alcohols, such as the monochlorohydrins of glycerol, sorbitol, pentaerythritol and the like.

Another class of polymeric polyepoxides which can be cured by means of the amine curing agents and fortified, includes the epoxy novolac resins obtained by reacting, preferably, in the presence of a basic catalyst, e.g. sodium or potassium hydroxide, an epihalohydrin, such as epichlorohydrin, with the resinous condensate of an aldehyde, e.g. formaldehyde, and either a monohydric phenol, e.g. phenol itself, or a polyhydric phenol. Further details concerning the nature and preparation of these epoxy novolac resins can be obtained in H. Lee and K. Neville (op.cit.).

Other suitable polyglycidyl compounds are the polyglycidyl esters of polycarboxylic acids, such as the polyglycidyl esters of adipic acid, phthalic acid and the like. Polyglycidyl esters of polycarboxylic acids are described in U.S. Pat. No. 2,870,170 to Payne et al. Also suitable are polyglycidyl compounds produced by reacting epichlorohydrin with aromatic amines such as aniline, 2,6-dimethylaniline, p-toluidine, m-chloroaniline, p-aminodiphenyl, m-phenylenediamine, p-phenylenediamine, 4,4'-diaminodiphenyl methane, or with amino phenols such as p-aminophenol, 5-amino-1-n-naphthol, 4-aminoresorcinol, 2-methyl-4-aminophenol, 2-chloro-4-aminophenol and the like. Specific compounds include, among others, N,N-diglycidylaniline, N,N-diglycidyl-2,6-dimethylaniline, N,N,N',N-tetraglycidyl-4,4'-diaminodiphenyl methane, the triglycidyl derivative of p-aminophenol wherein the aminohydrogen and OH hydrogen atoms are replaced by glycidyl groups.

It will be appreciated by those skilled in the art that the polyepoxide compositions which can be cured and fortified according to the practice of the present invention are not limited to those containing the above described polyepoxides, but that these polyepoxides are to be considered merely as being representative of the class of polyepoxides as a whole.

The anhydride curing agents are any aliphatic or aromatic anhydride curing agents (hardeners) known in the art. Typical examples include succinic anhydride, polysebacic polyanhydride, maleic anhydride, Nadic methyl anhydride (NMA), hexahydrophthalic anhydride, dodecenylsuccinic anhydride, phthalic anhydride, tetrahydrophthalic anhydride, and dianhydride curing agents such as pyromellitic dianhydride, and benzophenonetetracarboxylic dianhydride (BTDA). We prefer alicyclic anhydrides, particularly when ease of processing is important.

The cross-linking catalyst may be of the amine type or of the acid type. Suitable amine cross-linking catalysts include BDMA, the alpha-methyl and 2-hydroxy BDMA derivatives, and tris (dimethylaminomethyl)-phenol. Suitable acid cross-linking catalysts include BF$_3$, carboxyl-terminated polyesters, and adipic acid. These catalysts are used in concentrations of about 0.1-0.6%. Tertiary amine catalysts usually are preferred.

The anhydride used for forming the fortifier may be either a monoanhydride (e.g. NMA and methyl tetrahydrophthalic anhydride) or a dianhydride (e.g. BTDA and pyromellitic dianhydride).

The aromatic amine reactant used to form the fortifier has the general formula

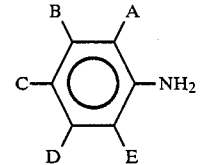

in which A-E are selected from hydrogen, lower alkyl (1-4 C atoms), groups having amide functionality or sulphonamide functionality, nitro, mercapto or halogen. Suitable compounds include m-aminoacetanilide, sulphanilamide, 3,4-dichloroaniline, m-nitroaniline, 2,4-dimethyl aniline and 4-chloro-2-nitroaniline.

The carboxylic acid component added to the fortifier reaction product preferably is selected from those which are soluble in the anhydride-amine reaction product. Two acids found particularly valuable for this application are maleic acid and the acid produced by partial hydrolysis of NMA. The latter compound was prepared by heating NMA and water at the desired molar ratio (typically about 1.5:1) to about 85° C. for two hours in the presence of, e.g. 0.2% diethylamine hydrochloride catalyst. The acid content of the resultant hydrolysis product was determined by anhydrous titration: a preferred acid/anhydride content ranges from about 0.05:1 to about 1:1 acid-to-anhydride ratio (see S.

Siggia, "Quantitative Organic Analysis via Functional Groups" J. Wiley, New York, 1963). Long chain (e.g. $C_{12}-C_{22}$) fatty acids are also effective as the acid component of the fortifier, but only in applications where a high $T_g$ is not required. Aliphatic dicarboxylic acids are preferred, but monocarboxylic acids and aromatic acids if soluble or dispersible in the reaction product, would be operative. Further examples include dodecanoic acid (or dodecyl anhydride), stearic acid and acetylsalicyclic acid. The carboxylic acid has been found necessary because with no acid present the tensile test specimen consistently failed in a brittle fashion.

The fortifier is formed by reaction of the anhydride and the aromatic amine, initially at about 50°–70° C., preferably 60° C., followed by heating usually within about 120° C. to 170° C. for 1–2 hours. If the reactants are liquids or low melting point solids, no solvents are necessary, although for high melting point ingredients (e.g. BTDA) the presence of acetone, dimethylformamide or other suitable solvent facilitated processing. An excess of anhydride (1 mole anhydride to 0.1–0.9 moles amine or a molar ratio of anhydride to amine of about 1/1–10/1) is present in the reaction mixture. Generally, a precipitate is formed on initial reaction of anhydride and amine, which dissolves on heating at $\geq 120°$ C. The major volatile product is water which may be removed, e.g. by a stream of nitrogen. The mixture is allowed to cool and preferably the carboxylic acid (within about 0.05–1.5 moles for the 1.1–1.9 moles of the fortifier above) is added at this point. In the case of subsequent maleic acid addition to the reaction product, a temperature of about 90°–100° C. is necessary to dissolve the acid. Other solvents which may be used as reaction medium are dimethylacetamide, methyl isobutyl ketone and 1-methyl-2-pyrrolidinone. With lower boiling point solvents, the latter stage of the reaction will need to be under pressure. The solvent is removed after the reaction by volatilization (it is possible to delay this until the final heat curing of the resin).

The final reaction products are complex chemical mixtures which were used as fortifiers without further purification or separation. The preferred products were viscous oils or low melting point solids, because of their ease of mixing with the epoxy resin system. Higher melting point products required the use of solvent casting techniques to prepare the cured plastic. When using liquid anhydrides such as NMA, it was particularly advantageous to have a larger excess of anhydride (e.g. 5:1 molar ratio of anhydride to amine) so that the final product was an easily-handled fluid. The anhydride functionality of the fortifier was determined by anhydrous titration (S. Siggia, op.cit.) and the calculated value was used in determining the stoichiometric balance of the epoxy resin/anhydride curing agent/fortifier mixture.

The preferred procedure for preparation of cured plastic specimens was as follows. The amount of additional anhydride curing agent was calculated from a knowledge of the epoxy equivalent of the resin, the anhydride functionality of the fortifier and the carboxylic acid content. The presence of carboxylic acid also reduces the requirement for anhydride curing agent (H. Lee and K. Neville, op.cit.) and in general 1 equivalent of acid reduced the requirement for anhydride by about 1.5 equivalents. Preferably the calculated amount of anhydride curing agent was dissolved in the fortifier and the mixture degassed. The epoxy resin was degassed separately, then added to the fortifier/curing agent mixture and stirred thoroughly. Finally, the cross-linking catalyst was added and the mixture poured into stainless steel moulds. Cure cycles followed conventional practice with an initial relatively low temperature cure (typically 6 hours at 80° C.) followed by a post-cure (typically 6 hours at 150° C.). Those skilled in the art will be able to determine a suitable cure cycle for any particular system.

Machining and mechanical testing procedures followed conventional practice. The results of tensile testing are described in the Examples section. Another test procedure of technological interest is the determination of fracture energy (critical strain energy release rate $G_{Ic}$). This test was carried out as described by Ting and Cottington (J. Applied Polymer Science 29, 1403, 1984), on rectangular compact tension specimens using a 1 mm/min strain rate. The control material (Epon 828 TM /NMA/BDMA) had a fracture energy of about 150 J/m$^2$, while the fortified samples typically showed increases of 40–120% in fracture energy (330 J/m$^2$ for B, 230 J/m$^2$ for D, 310 J/m$^2$ for H; for nomenclature of fortifiers see Examples section). The moisture uptake characteristics of the plastics (5 day, 50° C., 95% humidity) also varied with the formulation, from 25% more than the control for fortifier B to 45% less than the control for fortifier F.

The following examples are illustrative.

EXAMPLE 1

Nadic methyl anhydride (NMA, 1 mole) and m-aminoacetanilide (MAA, 0.33 mole) were mixed and heated to 125° C. for 90 minutes under flowing nitrogen. In a separate flask, NMA and water at a molar ratio of 1.5:1 were heated to 85° C. for 2 hours with 0.2% diethylamine hydrochloride catalyst, to produce the hydrolysed NMA which forms the carboxylic acid component of this fortifier. 0.45 equivalents of carboxylic acid were added to the NMA/MAA reaction product to produce a fortifier designated "A". 67 PHR (parts per hundred parts of resin) of A was mixed with 47 PHR NMA curing agent, degassed, then added to 100 parts Epon 828 (Trademark of a DGEBA-type epoxy resin) and 1 part benzyldimethylamine (BDMA) catalyst. The mixture was cured at 80° C. for 4 hours and 150° C. for 6 hours, to give a plastic with a tensile strength of 112 MPa, a tensile modulus of 3300 MPa, an elongation of 4.0% and a $T_g$ of 125° C. In comparison, the unfortified Epon 828/NMA/BDMA typically has a tensile strength of 80 MPa, a tensile modulus of 3000 MPa, an elongation of 2.4% and a $T_g$ of 138° C.

EXAMPLE 2

NMA (1 mole) and MAA (0.35 moles) were mixed and heated to about 130° C. for two hours. When the product had cooled to 100° C., 0.24 moles of maleic acid were added, and the mixture stirred until the maleic acid dissolved, to give a fortifier designated "B". NMA at 20 PHR was added to 95 PHR of B, degassed, then added to 100 parts Epon 828 and 1 PHR BDMA catalyst. The mixture was cured at 80° C. for 5 hours and 160° C. for 6 hours to give a plastic with a tensile strength of 118 MPa and an elongation of 4.1%.

EXAMPLE 3

Benzophenone tetracarboxylic acid dianhydride (BTDA, 1 mole), as a slurry in methyl ethyl ketone was mixed with an acetone solution of m-aminoacetanilide (MAA). The resultant precipitate was washed with hot acetone then added to NMA (3.2 moles), and the mixture heated to 160° C. for 40 minutes under flowing nitrogen. When the product had cooled to 100° C., maleic acid (1.1 mole) was added and stirred until dissolved, to give a fortifier designated "C". Because of the high anhydride functionality of fortifier "C", no additional anhydride curing agent was required, and the fortifier was mixed at 100 PHR with Epon 828 and 1 PHR BDMA catalyst. After a cure cycle of 5 hours at 80° C. and 6 hours at 150° C., a plastic was produced with a tensile strength of 100 MPa and an elongation of 3.4%, together with a glass transition temperature of 140° C.

EXAMPLE 4

NMA (1 mole) and 2,4-dimethylaniline (DMA, 0.25 moles) were mixed and heated to 160° C. for 2.5 hours. When the product had cooled to 90° C., 0.18 moles of maleic acid was added and the mixture stirred until the maleic acid dissolved, to give a fortifier designated "D". Because of the high anhydride functionality of fortifier D, no additional anhydride curing agent was required and the fortifier was mixed at 105 PHR with Epon 828 and 1 PHR BDMA catalyst. After a cure cycle of 6 hours at 80° C. and 6 hours at 150° C., a plastic was produced with a tensile strength of 114 MPa and an elongation of 3.5%.

EXAMPLE 5

NMA (1 mole) and m-nitroaniline (MNA, 0.28 moles) were mixed and heated to 160° C. for 2.5 hours. When the product had cooled to 90° C., 0.18 moles maleic acid was added and the mixture stirred until the maleic acid dissolved, to give a fortifier designated "E". Because of the high anhydride functionality of fortifier E, no additional anhydride curing agent was required and the fortifier was mixed at 105 PHR with Epon 828 and 1 PHR BDMA catalyst. After a cure cycle of 6 hours at 80° C. and 6 hours at 150° C., a plastic was produced with a tensile strength of 112 MPa and an elongation of 3.5%.

EXAMPLE 6

NMA (1 mole) and 3,4-dichloroaniline (DCA, 0.23 moles) were mixed and heated to 160° C. for 1.5 hours. When the product had cooled to 90° C., 0.18 moles of maleic acid was added and the mixture stirred until the maleic acid dissolved to give a fortifier designated "F". Because of the high anhydride functionality of fortifier F, no additional anhydride curing agent was required and the fortifier was mixed at 105 PHR with Epon 828 and 1 PHR BDMA catalyst. After a cure cycle of 6 hours at 80° C. and 6 hours at 150° C., a plastic was produced with a tensile strength of 108 MPa and an elongation of 4.0%.

EXAMPLE 7

NMA (1 mole) and 4-chloro-2-nitroaniline (CNA, 0.23 moles) were mixed and heated to 160° C. for 1.5 hours. When the product had cooled to 90° C., 0.18 moles of maleic acid was added and the mixture stirred until the maleic acid dissolved, to give a fortifier designated "G". Because of the high anhydride functionality of fortifier G, no additional anhydride curing agent was required and the fortifier was mixed at 105 PHR with Epon 828 and 1 PHR BDMA catalyst. After a cure cycle of 6 hours at 80° C. and 6 hours at 150° C., a plastic was produced with a tensile strength of 108 MPa and an elongation of 5.0%.

EXAMPLE 8

NMA (1 mole) and p-aminoacetanilide (PAA, 0.23 moles) were mixed and heated to 160° C. for 2 hours. When the product had cooled to 90° C., 0.18 moles of maleic acid was added and the mixture stirred until the maleic acid dissolved to give a fortifier designated "H". Because of the high anhydride functionality of fortifier H, no additional anhydride curing agent was necessary, and the fortifier was mixed at 105 PHR with Epon 828 and 1 PHR BDMA catalyst. After a cure cycle of 6 hours at 80° C. and 6 hours at 150° C., a plastic was produced with a tensile strength of 111 MPa and an elongation of 3.8%.

The Figure shows the % elongation at break for cured Epon 828 resin systems containing the fortifiers of Examples 2, 6 and 7 compared to a control having no fortifier. Test results showed that the presence of fortifier contributed to an increase in the stiffness, strength, elongation and ductility of the cured resin.

We claim:

1. A fortifier for strengthening anhydride-cured epoxy resins comprising:
   (i) a carboxylic acid;
   and (ii) the reaction product of a carboxylic acid anhydride and an aromatic amine;
the molar proportions of (i) to (ii) being selected to give a final free anhydride-to-acid mole ratio within the range of about 0.05/1 up to about 10/1, and wherein the aromatic amine reactant used to form the reaction product has the formula:

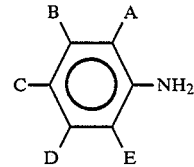

where A to E are selected from hydrogen, lower alkyl, nitro, halogen, mercapto, and groups having amide or sulphonamide functionality.

2. A curable epoxy resin system comprising a resin-forming polyepoxide, curable with both anhydride curing agent and cross-linking catalyst therefor; and as a fortifier for strengthening said resin system a mixture comprising:
   (i) a carboxylic acid
   and (ii) the reaction product of a carboxylic acid anhydride and an aromatic amine;
the molar proportion of (i) to (ii) being selected to give a final free anhydride-to-acid mole ratio within the range of about 0.05/1–10/1, and wherein the aromatic amine reactant used to form the reaction product has the formula:

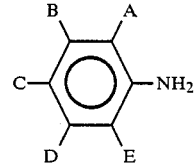

where A to E are selected from hydrogen, lower alkyl, nitro, halogen, mercapto, and groups having amide or sulphonamide functionality.

3. The curable epoxy resin system of claim 2 wherein sufficient excess anhydride groups are present in the fortifier to cure the system without added anhydride curing agent; and including a cross-linking catalyst.

4. The curable epoxy resin system of claim 2 including both anhydride curing agent and a cross-linking catalyst.

5. The composition of claim 1 wherein the carboxylic acid component (i) of the fortifier is soluble in reaction product (ii).

6. The compositions of claim 1 wherein the carboxylic acid component (i) of the fortifier is a dicarboxylic acid.

7. The compositions of claim 1, wherein the anhydride reactant used to form the reaction product is a mono- or di-anhydride.

8. The compositions of claim 1 wherein the reactants in (ii) are reacted in the molar ratio of anhydride to amine within the range of about 1/1 up to about 10/1.

9. The compositions of claim 1 wherein the proportion of (i) ranges from about 0.1–1.5 mole per mole of (ii).

10. The composition of claim 3 cured to a strong high modulus form.

11. The composition of claim 4 cured to a strong high modulus form.

12. A method of preparing an epoxy resin composition curable to a high strength and high modulus solid, comprising:
  (a) pre-reacting a carboxylic acid anhydride with an aromatic amine to form a fortifier reaction product;
  (b) mixing said reaction product with a resin-forming polyepoxide to form a mixture;
  (c) providing for the presence in said mixture of sufficient anhydride groups to cure said resin composition by one of (i) ensuring that said reaction product contains excess unreacted anhydride groups, and (ii) including in the mixture an anhydride curing agent;
  (d) providing that said mixture contains an unreacted carboxylic acid; and
  (e) incorporating a cross-linking catalyst to form said curable composition.

13. The method of claim 12, wherein said pre-reaction is carried out in a mutual solvent which is removed later.

14. The method of claim 12 wherein an anhydride curing agent is blended with said reaction product.

15. The method of claim 12 wherein said carboxylic acid is blended with said reaction product, said carboxylic acid being selected to be soluble in said reaction product.

16. The method of claim 12 including heat curing the curable composition to form a strong, high modulus solids.

* * * * *